2,791,078

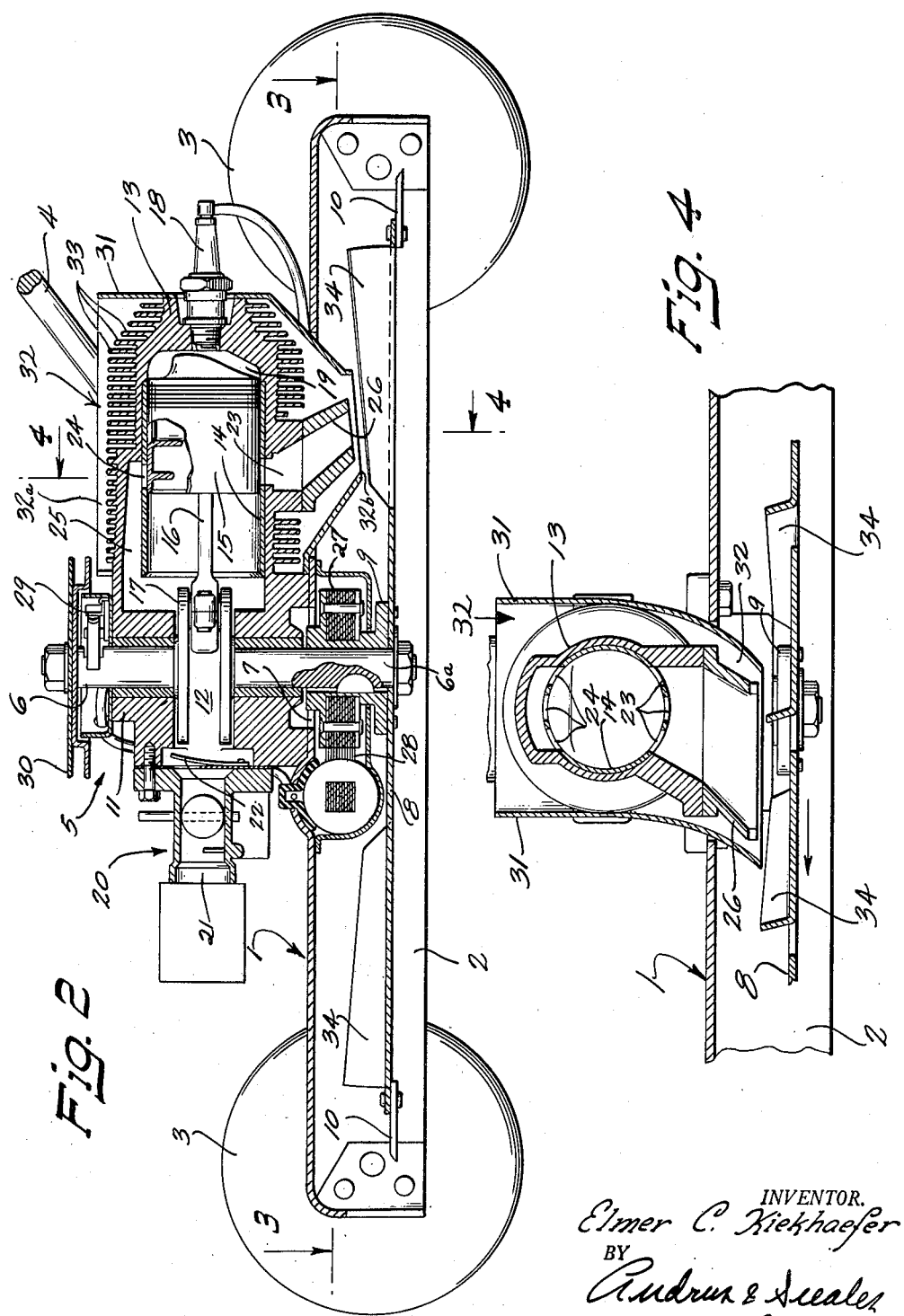

POWER MOWER WITH CUTTER BLADE FAN FOR COOLING AND EXHAUSTING MOTOR

Elmer C. Kiekhaefer, Cedarburg, Wis.

Application August 12, 1953, Serial No. 373,812

2 Claims. (Cl. 56—25.4)

This invention relates to a rotary-type lawn mower and particularly to the operation of the engine and cooling of the same by the mower cutting blade.

The invention provides a wheeled lawn mower having a horizontally disposed rotating cutting blade driven by an engine and which operates within the base of the mower to effect the circulation of cooling air over the engine cylinder and to promote the discharge and scavenging of the engine cylinder.

An object of the invention is to provide a mower having a rotary-cutting blade carrying other vanes which are effective for cooling the engine and discharge of the exhaust gases in the engine.

Another object is to utilize the base of the rotary lawn mower as a fan housing for cooling the engine.

Another object is to utilize the velocity of the exhaust gases as well as the centrifugal action fan blades to move the necessary volume of air over the engine cylinder to cool the same.

Another object is to provide a lawn mower of less expensive construction by utilizing the cutting element and the base of the mower to carry and form part of the cooling system of the engine.

These and other objects and advantages will be more fully set forth in the following description of a preferred embodiment of the invention as illustrated in the accompanying drawings.

In the drawings:

Fig. 2 is an enlarged vertical cross-section taken through the axis of the crankshaft of the engine and the cylinder of the engine as on line 2—2 of Fig. 1;

Fig. 4 is a section taken on line 4—4 of Fig. 2.

Figure 1:
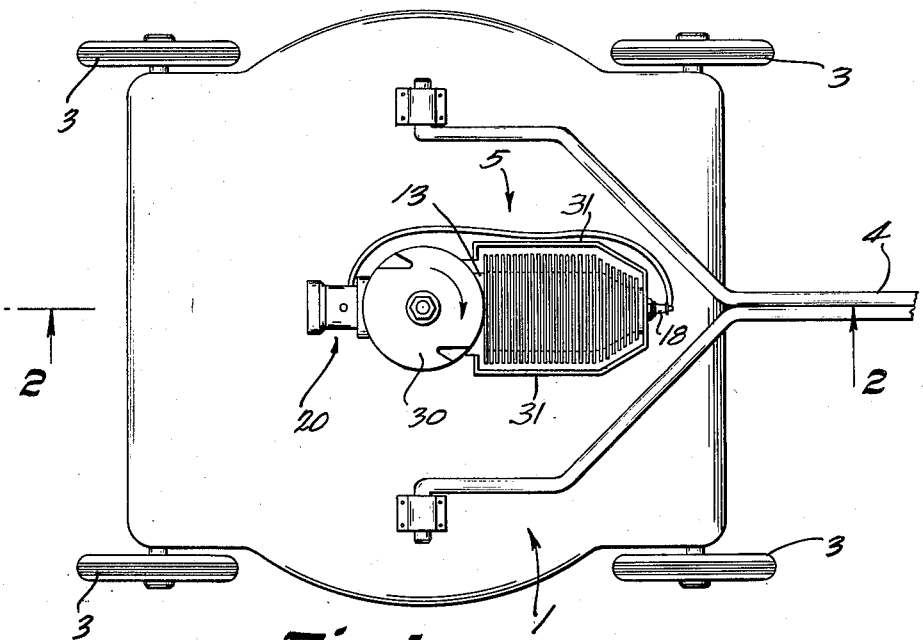
Figure 1 is a top plan view of the lawn mower.
Figure 3:
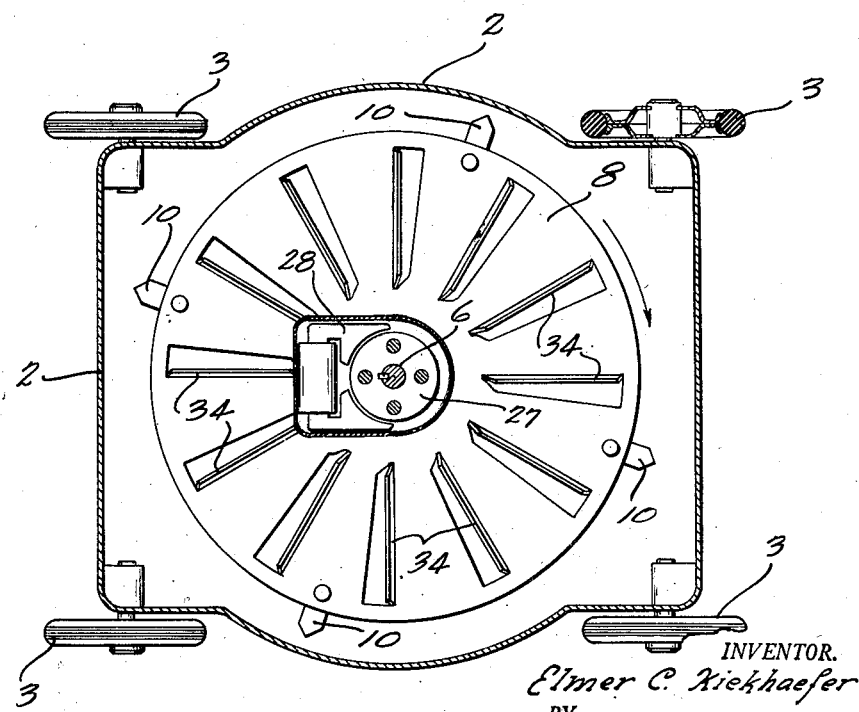
Fig. 3 is a section taken on line 3—3 of Fig. 2 and reduced to the scale of Fig. 1.

The lawn mower shown in the drawings includes the hollow flat base 1 with sides formed by the downwardly turned marginal flanges 2. Base 1 is provided with the wheels 3 and the handle 4 by which the mower may be moved over the lawn to be cut. The engine 5 is secured to the upper side of base 1 near the center thereof and includes the vertical crankshaft 6 having a lower end 6a which projects through the opening 7 in base 1 to support and turn the cutter rotor 8 disposed horizontally beneath the base. The cutter rotor 8 is preferably a metal plate in the form of a disc fixed to the hub 9 mounted on the lower end 6a of shaft 6, and carries the cutting blades 10 which project from the periphery of the disc to move therewith at a preselected height to cut the grass as the mower is moved thereover.

Engine 5 includes the crankcase 11 having a crank chamber 12 which encloses the crank of crankshaft 6 and the cylinder block 13 having a cylinder bore 14 with the piston 15. The rod 16 connects the crank throw 17 of crankshaft 6 and piston 15 for reciprocation of the latter in bore 14.

The spark plug 18 is fitted in the end of block 13 which closes the bore 14 to form a combustion chamber 19 above piston 15. The lower end of bore 14 below the piston opens into chamber 12 whereby the movement of the piston compressing the fuel charge in the upper end of bore 14 simultaneously effects the induction of a fuel charge from the carburetor 20 into chamber 12. The filter and carburetor assembly 20 includes the fuel mixing passage 21 having communication with chamber 12 which is controlled by the reed valve 22.

During the power stroke of piston 15, valve 22 is closed whereby the fuel mixture in chamber 12 is compressed by piston 15. In approaching the end of the power stroke, the exhaust ports 23 formed in block 13 opening from chamber 19 are uncovered by piston 15 to allow the discharge of the exhaust gases therefrom. Shortly after the opening of ports 23, the opposite ports 24 are uncovered by piston 15 to open the passage 25 from chamber 12 and allow the precompressed fuel mixture from the chamber 12 to be transferred to combustion chamber 19 to displace the burned gases remaining therein.

Ports 23 are disposed in the underside of block 11 to be uncovered by the piston 15 for the release of the exhaust gases from chamber 19 into the exhaust conduit 26 which extends from cylinder block 13 through base 1 of the lawn mower and opens beneath the base and immediately above disc 8.

The magneto providing the electrical potential for engine ignition by the spark plug 18, includes the rotor 27 mounted on the lower end of crankshaft 6 above disc 8 and the stator 28 secured to base 1 beneath the engine. The circuit breaker mechanism 29 is located beneath the starter pulley 30 and is operated by a suitable cam formed in the upper end of crankshaft 6 which carries the pulley 30.

According to the invention, the vertical wall members 31 enclose cylinder block 13 to provide the duct 32 having an open upper end 32a and the open lower end 32b which extends downwardly of the cylinder block through base 1 of the mower and around the exhaust conduit 26. The lower end 32b of duct 32 extends angularly in the general direction of rotation of disc 8 and the lower end of exhaust conduit 26 similarly extends angularly within the constricted lower end 32b of duct 32. The lower end of exhaust conduit 26 opens into base 1 adjacent to the lower open end 32b of duct 32 whereby the exhaust gases from the engine discharged from conduit 26 induces a flow of air directly through duct 32 and over the fins 33 of engine block 13.

Disc 8 provides the necessary flywheel inertia for the operation of the engine and has a series of radially extending vertical blades 34 struck from the disc and which pass beneath the lower end of duct 32. Rotation of disc 8 in the operation of the lawn mower induces the flow of air through duct 32 for cooling of the engine and during periods of engine exhaust as described clears the exhaust conduit 26 to promote the more complete exhausting of the engine cylinder and improved engine operation.

Suitable openings, not shown, in the marginal flange 2 of base 1 may be provided for the discharge of the engine exhaust with the cut grass.

The integrated elements of the engine and lawn mower provide a lightweight mower of exceptional cutting capacity at low cost.

Various embodiments of the invention may be employed within the scope of the following claims:

I claim:

1. In a power lawn mower, a mobile casing having a horizontal wall with a central opening, a two-cycle internal-combustion engine mounted on said casing with its crankshaft disposed vertically and extending downwardly through said central opening and with a cylinder lying horizontally above and adjacent said casing wall, said engine having a crankcase providing bearings for said crankshaft and having fuel supply means adapted to supply fuel mixture thereto, said cylinder having a fuel induction passage from said crankcase and having an exhaust port in the bottom wall of the cylinder, conduit means extending through said casing wall from said exhaust port and adapted to discharge the exhaust from said cylinder to the region beneath said casing wall, air cooling fins on said cylinder and disposed vertically, an open top air cooling duct surrounding said cylinder and fins and opening downwardly through said casing wall around said exhaust conduit means, a grass cutting blade carried by the lower end of said crankshaft beneath said casing wall, and fan blades on said grass cutting blade adapted to pass beneath the discharge mouth of said exhaust conduit and said cooling duct during rotation of said grass cutting blade by said crankshaft, said fan blades disposed to draw air downwardly through said air cooling duct and to mix the same with the exhaust from said exhaust conduit whereby the exhaust gases are cooled before they reach the grass and whereby the engine cylinder is cooled during operation of the lawn mower.

2. In a power lawn mower, a mobile casing having a horizontal wall with a central opening, a two-cycle internal-combustion engine mounted on said casing with its crankshaft supported vertically and extending downwardly through said central opening and with a cylinder lying horizontally above and adjacent said casing wall, said cylinder having a downwardly opening exhaust port in the lower wall thereof, air cooling fins on said cylinder and disposed vertically, a grass cutting blade carried by the lower end of the crankshaft beneath said casing wall, conduit means extending from the cylinder exhaust port downwardly through the casing wall and angularly in the general direction of blade rotation and adapted to discharge the exhaust from the cylinder to the region beneath the casing wall, an air cooling duct surrounding said cylinder and fins and opening downwardly through said casing wall with the lower portion of the duct disposed angularly in the general direction of blade rotation around said exhaust conduit means, and fan blades on said grass cutting blade adapted to pass beneath the discharge mouth of the exhaust conduit means and said air cooling duct during rotation of the grass cutting blade by the crankshaft, the angular disposition of the exhaust conduit means and the lower portion of the cooling duct serving to facilitate the fan blades in the removal of exhaust from the cylinder and in the movement of cooling air around the cylinder and exhaust conduit means.

References Cited in the file of this patent

UNITED STATES PATENTS

| | | |
|---|---|---|
| 2,071,872 | Cockburn | Feb. 23, 1937 |
| 2,444,103 | Kuhn | June 29, 1948 |
| 2,504,416 | Hileman | Apr. 18, 1950 |
| 2,533,487 | Maurer et al. | Dec. 12, 1950 |
| 2,557,598 | Daggett | June 19, 1951 |
| 2,597,774 | Britten | May 20, 1952 |

FOREIGN PATENTS

| | | |
|---|---|---|
| 8,597 | Great Britain | Apr. 19, 1906 |